APPARATUS FOR REDUCING BRIGHTNESS VARIATION USING PHOTOCHROMIC MATERIAL

Filed June 21, 1963

INVENTOR.
ANGELO MONTANI
BY
Raymond R. Skolnick

United States Patent Office 3,225,138
Patented Dec. 21, 1965

3,225,138

APPARATUS FOR REDUCING BRIGHTNESS VARIATION USING PHOTOCHROMIC MATERIAL

Angelo Montani, Great Neck, N.Y., assignor to Sperry Rand Corporation, Ford Instrument Company Division, Long Island City, N.Y., a corporation of Delaware Filed June 21, 1963, Ser. No. 289,540
12 Claims. (Cl. 178—7.2)

Figures 1, 2, 3:
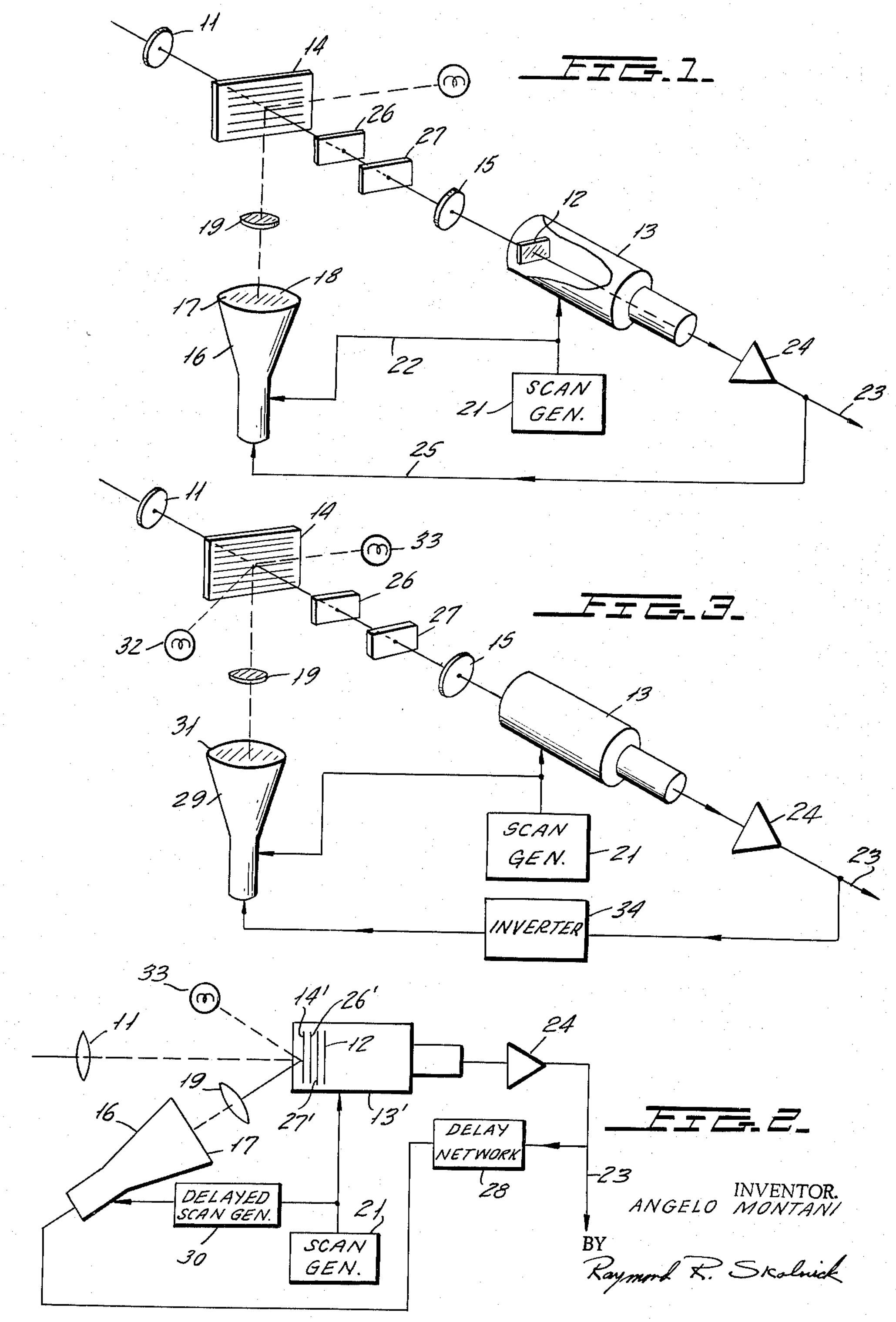

This invention relates to a device for effecting dodging of television images, and more particularly to such a device for automatically decreasing the variations in light intensity of images formed on television camera tube target surfaces.

Television camera tubes, such as the well-known image orthicon and vidicon tubes, are inherently unable to provide maximum image resolution when strong illumination gradients are simultaneously present within the field of view. The monitoring operator must decide whether to set the camera controls to obtain the maximum resolution of the scarcely illuminated areas or of the highlights of the scene televised. It is presently infeasible to obtain the optimum resolution of both the bright and dark areas of the viewing field.

When shows are produced in television studios the illumination may be predetermined to minimize the lighting gradients and thus facilitate optimum image resolution. However, in outdoor locations employing natural illumination, the camera operator can only set the controls for maximum illumination in a particular area within the field of view. Similarly, for night time pickups, the camera must be set for maximum sensitivity and cannot compensate for the variations in illumination to which it is subjected. In such circumstances street lamps will, for example, produce a black halo on a television screen blocking out an area of the transmitted scene.

It is known in photography that the density variations of a photographic image can be decreased to facilitate improved interpretation of details by so-called dodging techniques. One procedure for effecting automatic dodging during photographic processing involves utilization of masking images formed in photochromic layers, i.e., layers containing materials whose spectral absorption characteristics may be reversibly changed upon exposure to light having a particular range of wave lengths. One such highly effective photochromic dodging procedure is disclosed in my copending application Serial No. 252,075 filed on January 17, 1963.

It is among the objects of the present invention to provide a device utilizing a photochromic dodging technique for improving the image resolution of television scenes subjected to marked illumination gradients.

Another, and a principal object of the invention is to provide such a device for decreasing the variations in light intensity of an image formed on a television tube target surface, in order to provide optimum resolution of the several elements of the illuminated scene irrespective of the differences in local illumination.

A further object of the invention is to provide such a device for forming a masking image in optical register with the image formed upon the light sensitive target surface of the television camera tube, which masking image effects the desired decrease in differential image illumination.

In accordance with this invention, a device for decreasing the variations in light intensity of an image formed on a television camera tube target surface is provided, comprising a photochromic layer disposed for optical alignment with the target surface such that the image of the televised scene passes through such layer, and a cathode ray tube whose phosphor-bearing face is optically aligned with the photochromic layer such that a masking image produced in such layer by light transmitted from the face of the cathode ray tube is registered with the televised image projected through the photochromic layer. Electrical connections are provided between the television camera tube and the cathode ray tube for forming a raster on the face of the latter corresponding to the raster on the camera tube target surface and for modulating the intensity of the light produced by the phosphor elements on the cathode ray tube face responsive to the output video signal produced by the camera tube. Such device produces a masking image in the photochromic layer, the densities of which are related to the variations in illumination of the televised screen. Such mask decreases the light intensity gradients of the light image impinged upon the television tube target surface, thereby facilitating improved optical resolution of the details of the scene televised.

The nature and objects of the invention will be more fully appreciated from a consideration of the following detailed description of several preferred embodiments thereof, taken in connection with the accompanying drawing in which:

FIGURE 1 is a schematic view of the components of a device for decreasing the light intensity gradients of a television image in direct proportion to the intensity of the individual areas of the image to be corrected;

FIGURE 2 is a schematic view showing a device similar to that of FIGURE 1, in which the photochromic layer and optical filters associated therewith are mounted within the envelope of the television camera tube; and FIGURE 3 is a schematic view of a further embodiment of the invention for decreasing the light intensity gradients of a television image in inverse proportion to the intensity of the individual areas of the image to be corrected.

In accordance with the invention, a photochromic layer 14 is positioned in the focal plane of lens 11 receiving an image of the televised scene. A lens 15 focuses the composite image formed in the photochromic layer 14, more fully described hereinafter, on the light sensitive target surface 12 of the camera tube 13. It will be appreciated that any of the well-known television camera tubes, e.g., the image orthicon, vidicon, or iconoscope camera tubes, may be utilized.

The photochromic layer may include any of the well-known photochromic materials incorporated, for example, in a transparent plastic substrate, such as those photochromic materials disclosed in the aforesaid copending application Serial No. 252,075. Preferably, the photochromic material employed is one which is colorless under visible light, is darkened when exposed to ultraviolet light having a wave length of about 3,000 to 4,000 angstrom units and reverts back to the colorless state when bleached by subsequent exposure to visible light having a wave length of about 4,000 to 7,000 angstrom units.

Optically aligned with the photochromic layer 14 is a cathode ray tube 16. A phosphor array is provided on the face 17 of the cathode ray tube forming upon excitation, a raster 18 which may be synchronized with the scanning raster of the camera tube 13, as described hereinafter. The phosphor or phosphors defining such array are desirably of a type which is rich in ultraviolet radiation, such as P16.

An image of the raster 18 is projected upon the photochromic layer 14 by a lens 19. The cathode ray tube, lens and photochromic layer are so positioned and the raster 18 is of such dimensions relative to the photochromic layer 14 that the image produced thereby in the photochromic layer, referred to hereinafter as the masking image, is in registration with the image of the televised scene projected from lens 11 onto the photochromic layer. Thus, target surface 12 of the camera tube 13 sees, through lens 15, a composite image in which the light intensities of the sceen televised are modified by the registered masking image.

Conventional circuit elements are provided for electrically connecting the camera tube 13 with the cathode ray tube 16 for producing the raster 18 on the face 17 of the latter generally corresponding to the scanning raster of the camera tube, and for modulating the intensity of the light produced by the phosphor array on the face of the cathode ray tube responsive to the output video signal produced by the camera tube.

In the embodiment of FIGURE 1, the scanning raster of the camera tube 13 and the raster 18 produced on the face 17 of the cathode ray tube are synchronized by a conventional scan generator 21, whose output waveforms are connected by means of lead 22 to the deflecting elements of the cathode ray tube 16. The output video signal 23, after amplification by a conventional video amplifier 24, is connected by means of lead 25 to the electron gun of the cathode ray tube 16, a portion of the output video waveform thus effecting modulation of the beam intensity.

The high amplitudes of the output vedio signal 23 corresponding to relatively highly illuminated areas of the scene televised produce relatively strong excitation of the corresponding elements of the raster 18. The lesser amplitudes of the output video signal 23 produce corresponding lesser excitations. The phosphor array on the cathode ray tube face 17 is thus subjected to differential excitation corresponding to the differential illumination of the target surface 12 and produces a correspondingly modulated ultra-violet light image which is projected upon the photochromic layer 14. Upon impingement of the photochromic layer, differential darkening of the ultraviolet light sensitive areas thereof occurs, producing a masking image in register with and generally corresponding to the image of the televised scene projected therethrough. The darker areas of the masking image thus produced reduce the amount of light impinged upon the target surface 12 by a greater degree than the lighter areas, thus decreasing the variation of light intensities on the sensitive target surface 12 of the camera tube, in accordance with the invention.

Further conventional circuitry may be provided for setting the intensity controlling elements of the cathode ray tube 16 to allow the raster 18 to appear only when the amplitudes of the output video signal 23 exceed a predetermined threshold value. Since the amplitudes of the video signal 23 are directly proportional to the light intensities of the various areas of the image impinged upon the target surface 12, only those highly illuminated image areas which produce video amplitudes exceeding such threshhold value will be represented on the face 17 of the cathode ray tube and will be masked by a corresponding masking area formed in the photochromic layer 14.

Preferably, a first filter element 26 and a second filter element 27 are positioned in alignment with and between the photochromic layer 14 and the target surface 12. The filter 26 absorbs any back-scattered ultraviolet radiation, and the filter 27 absorbs the spectral lines of light produced by any fluorescence of the photochromic material in layer 14, without interfering with the transmission of the visible light impinging upon the target surface 12.

In other words, upon exposure of the photochromic layer 14 by ultraviolet light generated by the phosphor array on face 17 of the cathode ray tube, three distinct effects may occur. Most important, the initially transparent photochromic material darkens and develops one or more absorption bands, thereby absorbing a portion of the light from the televised scene prior to impingement upon the target surface 12. Secondly, some ultraviolet radiation may be produced by the photochromic material and back-scattered toward the target surface 12; such radiation is, as indicated above, absorbed by filter 26. Finally, excitation of the photochromic material may produce a temporary fluorescence corresponding to the areas at which the photochromic layer darkens; such fluorescent radiation is absorbed by filter 27. In this manner spurious signals, which may be produced by the action of the photochromic material, can be prevented from interfering with the desired signal.

A lamp 33, which emits radiations of wavelength longer than 0.5 micron (essentially infrared), will quickly bleach the darkened areas of the photochromic material 14 once the ultraviolet light from the cathode ray tube 16 is either extinguished or shifted in location. This fast bleaching is necessary in order to produce a mask which will always conform in geometrical shape to the highlights of the changing televised image.

The embodiment of FIGURE 2 of the drawing illustrates another mode of eliminating spurious signals from the dodged television image.

In this embodiment a delay network 28 is provided for delaying the signals impressed upon the face of the cathode ray tube 16. Hence, the raster produced on face 17 of the cathode ray tube lags the raster produced by the electron beam which scans the target surface 12, e.g., by three traces, and the video output utilized to modulate the beam intensity of the cathode ray tube 16 is delayed by the same number of traces relative to the video output 23, by means of a delayed scan generator 30. The electron beam which scans target surface 12 thus always sees an image produced through a mask on the photochromic layer 14′, which mask was itself produced slightly more than one frame earlier.

It has been found that, for general applications, changing of the mask need not coincide exactly with the changes of the images in the scene televised. Hence, as in the device shown in FIGURE 2, the forming of the mask may be delayed somewhat relative to the image to be directly reproduced without substantially interfering with the desired dodging effect. It is thus possible to sense and eliminate any spurious effects introduced by the masking image formed on the photochromic layer.

The photochromic layer 14′ and the filters 26′ and 27′ of the embodiment of FIGURE 2 are shown positioned in superposed relation within the envelope of the camera tube 13′. By thus positioning the several elements, it is possible to eliminate the additional focusing lens 15 shown in FIGURE 1. While elements 14′, 26′, 27′ and 12 have been shown in separated superposed relation for purposes of clarity it will be understood that they may, in practice, constitute a thin lamellar structure and nevertheless achieve the desired automatic dodging effect.

The embodiment of the invention illustrated in FIGURE 3 may be utilized in connection with a cathode ray tube 29 having a phosphor array on the face 31 thereof which does not emit ultraviolet light but rather essentially white light only. In the embodiment shown, an ultraviolet light source 32 and an infrared light source 33 irradiate the photochromic layer 14 for darkening the photochromic material and thereby increasing its absorptive properties. By balancing the intensities of the ultraviolet and infrared radiation impinging upon the photochromic layer 14 the photochromic material is normally maintained in the darkened light absorptive state.

An inverter circuit 34 connected to the output video signal provides for modulation of the electron beam of the cathode ray tube 29 so that such beam is activated only by video amplitudes below a predetermined value, while for higher amplitudes of the video signal, the cathode ray tube beam is markedly weakened or extinguished.

Highlight areas of the image impinging upon the target surface 12 within camera tube 13 provide output video amplitudes which are above the aforesaid predetermined value, hence no phosphorescence is produced in the corresponding areas on the face of the cathode ray tube 29. The photochromic layer 14 thus serves to reduce the light impinging upon the target surface 12 in such areas.

On the other hand, the cathode ray tube electron beam is modulated by the inverter 34 in the areas corresponding to lesser illuminated image areas which produce lower amplitudes of the output video signal. In such areas phosphorescence of the phosphor (P4) array produces an essentially white light which, upon impingement of the darkened photochromic layer, serves to partially or totally bleach the corresponding areas, permitting greater light transmission therethrough and thereby effecting a net decrease in the variations of the light intensities formed on the target surface 12.

Use of the embodiment illustrated in FIGURE 3 may be advantageous where cathode ray tubes emitting essentially white light are more readily available than ultraviolet light phosphorescing cathode ray tubes.

The present invention thus provides a device for decreasing the light intensity variations of images formed on television camera tube target surfaces, thereby facilitating greater resolution of image detail and providing an automatic dodging procedure useful for television pickups under adverse lighting conditions.

Since certain changes may be made in the above embodiments without departing from the scope of the invention, it is intended that all matter contained in the above description shall be interpreted as illustrative and not in a limiting sense.

The embodiments of the invention in which an exclusive privilege or property is claimed are defined as follows:

1. A device for decreasing the variations of light intensity of an image formed on a television camera tube target surface, comprising:
 (a) a photochromic layer adapted to be optically aligned with said target surface such that the image of the televised scene passes through said layer,
 (b) a cathode ray tube whose face is optically aligned with said layer such that a masking image produced in the photochromic layer by light transmitted from the face of the cathode ray tube is registered with the image of the televised scene projected through said layer, and
 (c) means for electrically connecting the television camera tube with said cathode ray tube for forming a raster on the face of the cathode ray tube corresponding to the raster on the target surface of said television camera tube and for modulating the intensity of the light produced by the phosphor elements on the face of the cathode ray tube responsive to the output video signal produced by the television camera tube.

2. The device as defined in claim 1, in which the means for electrically connecting the television camera tube with the cathode ray tube include intensity controlling means for producing a raster on the face of the cathode ray tube only when the video output of the television camera tube differs from a predetermined threshold value.

3. The device as defined in claim 1, in which
 (a) the means for electrically connecting the television camera tube with the cathode ray tube for forming a raster on the face of the cathode ray tube corresponding to the raster on the target surface of the television camera tube include a scan generator for scanning the image produced on said target surface and means connecting the scan generator to the deflecting elements of the cathode ray tube to apply the output waveforms of said generator to said cathode ray tube, and
 (b) in which the means for modulating the intensity of the light produced by the phosphor elements on the face of the cathode ray tube responsive to the video signal produced by said television camera tube include means for connecting the video output from said television camera tube to the electron beam of the cathode ray tube whereby a portion of the output video waveform modulates the intensity of said electron beam.

4. The device as defined in claim 1, in which
 (a) the phosphor array on the face of the cathode ray tube is rich in ultraviolet light radiation,
 (b) said device including a first optical filter adapted to be disposed in alignment with and between the photochromic layer and the target surface of the television camera tube for absorbing back-scattered ultraviolet radiation, and
 (c) a second optical filter adapted to be disposed in alignment with and between the photochromic layer and the target surface of the television camera tube for absorbing the spectral lines of light produced by fluorescence of said photochromic layer.

5. A device for decreasing the variations in light intensity of an image formed on a television camera tube target surface, comprising:
 (a) a photochromic layer optically aligned with said target surface such that the light image of the scene to be televised passes through said layer;
 (b) a cathode ray tube whose face is optically aligned with the photochromic layer such that a masking image produced in said layer by light transmitted from the face of the cathode ray tube is registered with the image of the televised scene projected through the layer; and
 (c) means electrically connecting the television camera tube with the cathode ray tube, said means comprising:
  (1) a scan generator connected to the television camera tube for scanning the image formed on the target surface thereof and connected to the deflecting elements of said cathode ray tube for forming a raster thereon synchronized with the scanning raster on said target surface, and
  (2) means connected to the video output from said television camera tube, said last mentioned means connected to the electron gun of said cathode ray tube for modulating the electron beam thereof by the output video waveform from said television camera tube.

6. The device as defined in claim 5, including means connected to the intensity controlling elements of said cathode ray tube for producing a raster on the face of said tube only when the amplitude of the video output exceeds a predetermined threshold value.

7. The device as defined in claim 5, including means for delaying the modulating video output and the raster formed on the phosphor array of said cathode ray tube relative to the corresponding output video waveform and scanning raster of the television camera tube so that the masking image produced in said photochromic layer by light transmitted from said cathode ray tube lags the image of the scene to be televised in order to detect and facilitate elimination of spurious signals produced in the photochromic layer.

8. The device as defined in claim 5, including a first optical filter disposed in alignment with and between said photochromic layer and said target surface of the television camera tube for absorbing back-scattered ultraviolet radiation and a second optical filter disposed in alignment with and between said photochromic layer and said target surface of the television camera tube for absorbing the spectral lines of light produced by fluorescence of said photochromic layer.

9. The device as defined in claim 8, in which said photochromic layer and said first and second optical filters are disposed in superposed relation within the envelope of the television camera tube adjacent the target surface thereof.

10. A device for decreasing the density variations of an image formed on a television camera tube target surface, comprising:
 (a) a photochromic layer optically aligned with said target surface such that the light image of the scene to be televised passes through said layer;

(b) a source of ultraviolet radiation and a source of infrared radiation optically aligned with said photochromic layer, said radiation source or sources effecting a uniform darkening of the photochromic layer;

(c) a cathode ray tube whose face includes a phosphor array which produces essentially white light upon excitation, said cathode ray tube face being optically aligned with the photochromic layer such that a masking image produced by partial bleaching of the darkened photochromic layer by light transmitted from the face of the cathode ray tube is registered with the image of the televised scene projected through the photochromic layer; and (d) means electrically connecting the television camera tube with said cathode ray tube for forming a raster on the face of the cathode ray tube corresponding to the raster on the target surface of said television camera tube and for modulating the intensity of the light produced by said phosphor array responsive to the video signal produced by the television camera tube.

11. The device as defined in claim 10, including means connected to the intensity controlling elements of said cathode ray tube for producing a raster on the face of said tube only when the amplitude of the video output is less than a predetermined value.

12. The device as defined in claim 10, including means for delaying the modulating video output and the raster formed on the phosphor array of said cathode ray tube relative to the corresponding output video waveform and scanning raster of the television camera tube so that the masking image produced in said photochromic layer by light transmitted from said cathode ray tube lags the image of the scene to be televised in order to detect and facilitate elimination of spurious signals produced in the photochromic layer.

No references cited.

DAVID G. REDINBAUGH, *Primary Examiner.*

J. A. ORSINO, *Assistant Examiner.*